United States Patent
Dietrich et al.

(10) Patent No.: US 6,909,602 B2
(45) Date of Patent: Jun. 21, 2005

(54) TEMPERATURE-CONTROLLED USER INTERFACE

(75) Inventors: Brenda Lynn Dietrich, Yorktown Heights, NY (US); Lawrence Shungwei Mok, Brewster, NY (US); Clifford Alan Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/153,688

(22) Filed: May 24, 2002

(65) Prior Publication Data

US 2003/0218862 A1 Nov. 27, 2003

(51) Int. Cl.[7] .................................................. H05K 7/20
(52) U.S. Cl. ..................... 361/687; 361/692; 361/695; 361/713; 219/209; 454/184
(58) Field of Search ................... 361/683, 680, 361/687, 695, 686, 688–689, 700–710, 722, 721; 165/80.2, 80.3, 122–126, 104.32–104.34, 185, 104.26–104.27; 174/51.2, 152, 16.3; 257/715–727; 312/223.1–223.3; 219/200–217, 528–529, 544, 548, 549; 601/15, 56, 57–60, 64, 66–70, 78; 248/118, 118.1, 118.3, 918

(56) References Cited

U.S. PATENT DOCUMENTS

| | | | | |
|---|---|---|---|---|
| 5,491,610 A | * | 2/1996 | Mok et al. ................... | 361/695 |
| 5,513,070 A | * | 4/1996 | Xie et al. .................... | 361/700 |
| 5,557,500 A | * | 9/1996 | Baucom et al. ............. | 361/687 |
| 5,568,360 A | * | 10/1996 | Penniman et al. .......... | 361/687 |
| 5,599,280 A | * | 2/1997 | Wolden ........................ | 601/15 |
| 5,686,005 A | * | 11/1997 | Wright, Sr. .................. | 219/549 |
| 5,694,294 A | * | 12/1997 | Ohashi et al. .............. | 361/687 |
| 5,792,025 A | * | 8/1998 | Kikinis ......................... | 482/1 |
| 5,828,034 A | * | 10/1998 | Chang ......................... | 219/209 |
| 6,115,540 A | * | 9/2000 | Klopotek .................... | 392/432 |
| 6,133,556 A | * | 10/2000 | Ramsey et al. ............. | 219/521 |
| 6,135,876 A | * | 10/2000 | Song et al. ................. | 454/184 |
| 6,215,657 B1 | * | 4/2001 | Bhatia ........................ | 361/687 |
| 6,239,390 B1 | * | 5/2001 | Fukui et al. ................ | 200/5 A |
| 6,255,622 B1 | * | 7/2001 | May et al. .................. | 219/209 |
| 6,327,144 B1 | * | 12/2001 | May ........................... | 361/687 |
| 6,362,740 B1 | * | 3/2002 | Jung .......................... | 340/584 |
| 6,404,627 B1 | * | 6/2002 | Tanaka et al. ............. | 361/687 |
| 6,414,844 B1 | * | 7/2002 | Shimada et al. ........... | 361/687 |
| 6,430,042 B1 | * | 8/2002 | Ohashi et al. ............. | 361/687 |
| 6,466,299 B1 | * | 10/2002 | Lehtiniemi et al. ......... | 349/199 |
| 6,515,856 B2 | * | 2/2003 | Hidesawa ................... | 361/687 |
| 6,525,934 B1 | * | 2/2003 | Nakanishi et al. .......... | 361/687 |
| 6,596,953 B2 | * | 7/2003 | Chu ........................... | 200/341 |
| 6,661,655 B2 | * | 12/2003 | Yin ............................. | 361/687 |
| 6,741,465 B2 | * | 5/2004 | Holalkere et al. .......... | 361/687 |

FOREIGN PATENT DOCUMENTS

| | | | | |
|---|---|---|---|---|
| DE | 29712146 U1 | * | 1/1997 | ............ G06F/3/033 |
| DE | 19638812 A1 | * | 3/1998 | ............ H01H/13/70 |
| JP | 404284519 A | * | 10/1992 | ............ G06F/1/20 |
| JP | 02000035850 A | * | 2/2000 | ............ G06F/1/20 |
| JP | 02000105636 A | * | 4/2000 | ............ G06F/1/20 |
| JP | 02000106056 A | * | 4/2000 | ............ H01H/13/14 |
| JP | 02000148307 A | * | 5/2000 | ............ G06F/1/20 |
| JP | 02000227820 A | * | 8/2000 | ............ G06F/1/20 |

* cited by examiner

*Primary Examiner*—Michael Datskovskiy
(74) *Attorney, Agent, or Firm*—Stephen C. Kaufman, Esq.; McGinn & Gibb, PLLC

(57) ABSTRACT

A system, includes a user input device, a temperature changing unit coupled to the user input device, and a controller, coupled to the temperature changing unit, for controlling the temperature of the user input device.

30 Claims, 5 Drawing Sheets

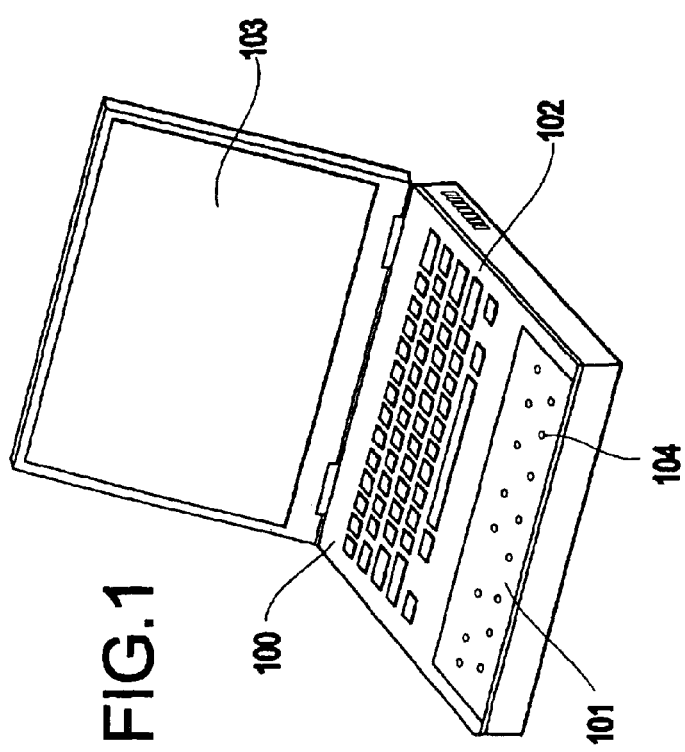
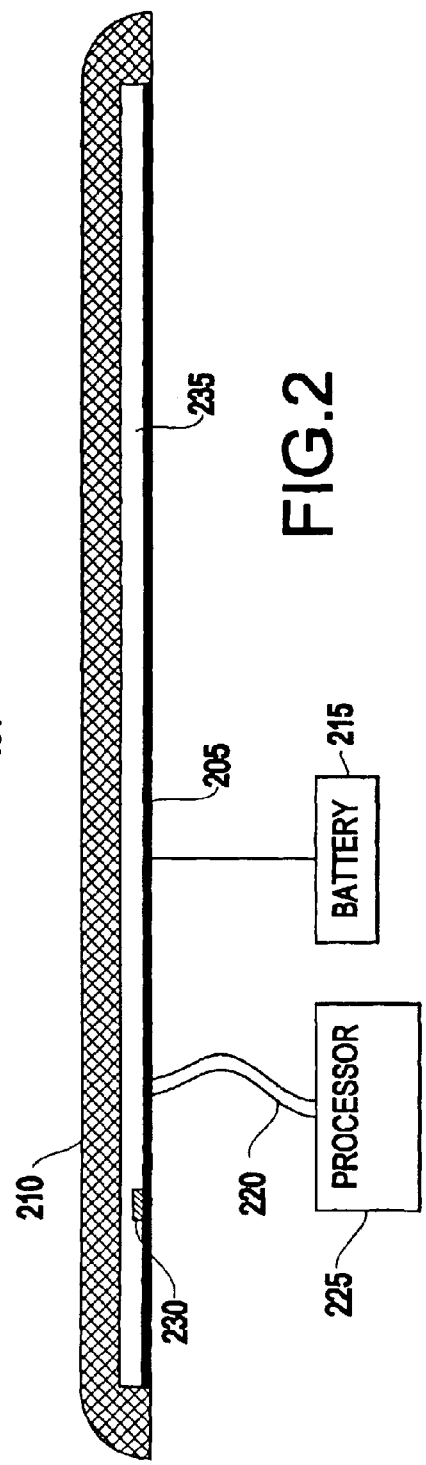

TEMPERATURE-CONTROLLED USER INTERFACE

BACKGROUND OF THE INVENTION

1. Field of the Invention

The present invention generally relates to the field of temperature-control and the transfer of heat from electronic components, and more particularly, to the removal of heat from an integrated circuit mounted on a circuit board of a computing device, and more particularly, to a system for controlling a temperature of a user input device.

2. Description of the Related Art

Integrated circuits in computers, including portable computing devices, generate a significant amount of heat. Typically fans, heat sinks, and heat pipes have been used to dissipate the heat from internal components.

Currently, this heat is "wasted" by channeling it away from the user. That is, there has been no beneficial use of such heat, such as using the heat for warming a user's hands, in cool working environments or the like.

For example, U.S. Pat. No. 5,513,070, incorporated herein by reference, discloses using heat pipes to divert heat to a plate beneath the keyboard. However, there is no disclosure of any novel airflow designs, or heated palm rests, thereby to keep the user's hands warm. Indeed, the above-mentioned U.S. Patent is not concerned with air flow or palm rests at all, nor variable control of heat directed towards a user's hands.

SUMMARY OF THE INVENTION

In view of the foregoing and other problems, drawbacks, and disadvantages of the conventional methods and structures, an object of the present invention is to provide a structure in which novel airflow designs are provided such that heat generated by a device is beneficially used.

Another object of the present invention is to provide a structure including heated palm rests.

In a first aspect of the present invention, a system includes a user input device, a temperature changing unit coupled to the user input device, and a controller, coupled to the temperature changing unit, for controlling the temperature of the user input device.

In a second aspect of the invention, a system includes a keyboard, an air channel beneath the keyboard, and a device for providing a flow of one of heated air and cooled air through the air channel.

In a third aspect, a system includes a palm rest, an air channel beneath the palm rest, and a device for providing a flow of one of heated air and cooled air through the air channel.

Thus, with the unique and unobvious aspects of the present invention, an improved temperature-control system is provided which is suited to users of device interfaces such as computer keyboards, keyboard palm rests, mice (or other similar input devices such as trackballs, joysticks, touch pads, etc.), video-game controllers, dials, steering wheels, and phone hand sets.

In a first embodiment, heat generated by the computer's processor chip (integrated circuit) is controllably diverted by a fan through the spaces between keys in a keyboard.

In a second embodiment, a palm rest is preferably heated using an electric heater beneath the palm rest.

In a third embodiment, the palm rest is preferably heated using a heat pipe that diverts heat from the processor chip.

In a fourth embodiment, heat generated by the computer's processor chip is preferably controllably diverted by a fan through holes in the palm rest.

In a fifth embodiment, a thermoelectric cooler is preferably used to heat or cool the palm rest.

With the unique and unobvious aspects of the invention, a heated user interface can be provided in environments in which a user's hands are cold (or are warm in an alternative embodiment). With trends toward reducing ambient office environments in order to save on electricity bills and the like, such a device should have increasing importance.

Hence, unlike the conventional structures, the invention uses novel airflow designs and heated palm rests, to beneficially use the heat (or cold), as opposed to simply wasting it.

In addition to user comfort, the controllable direction of heat (or cold) may have therapeutic value (e.g., for arthritic hands and the like), and blind people may find the blowing air and/or thermal gradient useful as a supplementary guide for positioning hands above the keyboard.

Other possible uses including drying fingernail polish, drying sweaty fingers and hands (e.g., a health condition known as hyperhidrosis and which affects about 5% of the population), and for drying the keyboard itself in moist or humid environments.

BRIEF DESCRIPTION OF THE DRAWINGS

The foregoing and other purposes, aspects and advantages will be better understood from the following detailed description of a preferred embodiment of the invention with reference to the drawings, in which:

FIG. 1 illustrates a typical laptop computer 100;

FIG. 2 illustrates a cross-section of a temperature-controlled palm rest 101;

DETAILED DESCRIPTION OF PREFERRED EMBODIMENTS OF THE INVENTION

Figure 3A:
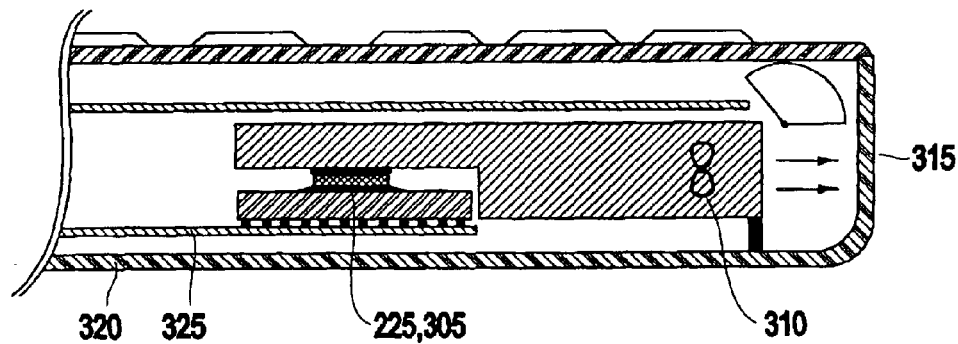
FIGS. 3A and 3B illustrate a side-view cross-section of a region under a keyboard 102 of the computer 100.

Referring now to the drawings, and more particularly to FIGS. 1–10, there are shown preferred embodiments of the structures according to the present invention in which the problems of the conventional structures are overcome, and specifically which channels heat (or cold in an alternative embodiment) to beneficially use the heat.

In one exemplary embodiment of the present invention, this heat can be used to warm a user's hands, which is of particular use in cool working environments. As mentioned, the invention could be similarly used in warm working environments where cool air could be provided to the user.

Preferred Embodiments

FIG. 1 shows a laptop computer 100 with a temperature-controlled palm rest 101, a keyboard 102, and a display 103, which exemplarily incorporates the present invention.

FIG. 2 shows a cross-section of the temperature-controlled palm rest 101. In FIG. 2, heat may be generated by a temperature unit 205 (e.g., temperature changing unit) to warm a user's hands when they are close to, or resting on, an optional foam pad layer 210 of the computer 100.

The temperature unit 205 (e.g., temperature changing unit) may be a thin-film electric heater traditionally made from polyimide and copper wires or the like. It preferably receives energy from a connection to a power source 215, such as a battery, or can be directly connected to household current.

Alternatively, the temperature unit 205 (e.g., temperature changing unit) may be a thermoelectric cooler which permits greater flexibility in that it can either heat or cool the user's hands depending on the polarity of electricity flowing to it. Thermoelectric coolers traditionally are made of semiconductor materials sandwiched between two ceramic plates.

In yet another embodiment, the temperature unit 205 (e.g., temperature changing unit) may be a plate that receives heat via a heat pipe 220, as shown in FIG. 2, that channels heat from the computer's processor 225 to the temperature unit 205 (e.g., temperature changing unit). In such a case, preferably a temperature sensor 230 resides in the heat spreader 235, or in the foam pad layer 210, to regulate the temperature of the temperature unit by providing a sensed temperature input to a control unit (not illustrated in FIG. 2).

It is noted that the palm rest 101 may be ventilated with the air flow in addition to the air flowing through/between the keys of the keyboard. For example, the palm rest 101 may have holes 104 optionally formed therein to enhance the air flow through the palm rest, and thereby to increase the heating (or cooling) being provided to the user.

FIG. 3A shows a side-view cross-section of a region under keyboard 102 of the laptop computer 100. Typically, an integrated circuit of the processor 225, 305 produces heat that is diverted from the chip by a fan 310 to outside of the computer 100 via ports or ducts 315.

FIG. 3A depicts a computer case 320 and a mother board 325.

Figure 3B:
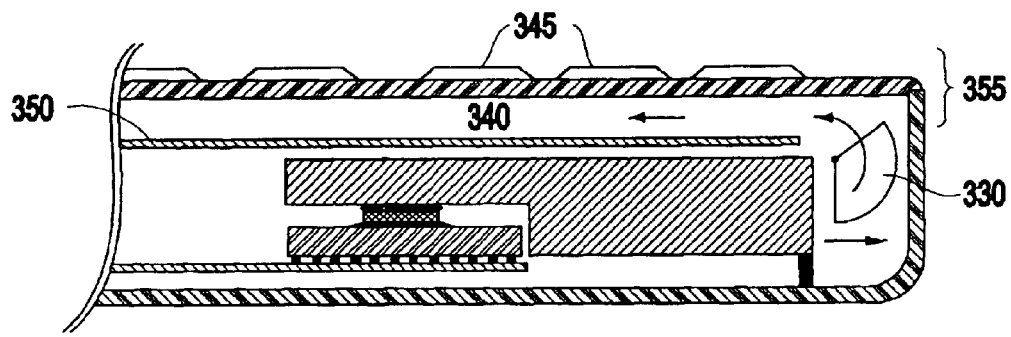

In the inventive configuration as shown in FIG. 3B, air is controllably diverted by a rotating diverter 330 (e.g., a rotational relay) that allows air to flow through a channel 340 and through the keys 345, thereby warming a user's hands. The diverter 330 may be rotated under a user's manual control, as discussed below, or by software (through use of the temperature sensor and processor) that automatically controls the diversion, and thus air temperature, to a user's hands.

When the diverter is controlled automatically, the system is termed "autonomic" or "self-adjusting". Here, a user need not take any explicit action to control the temperature of the user-input area. For example, a sensor 230 may detect an ambient room temperature of 50 degrees F., and thus be used to control the diverter 330 so that more heat is directed to a user's hand. Control parameters may reside in a profile (e.g., a data file on a local or network-attached storage device) that specifies target temperatures for the temperature of the user-input area.

For example, the diverter 330 may be positioned so that 50% of the heated air is diverted thought the keyboard and 50% is diverted through traditional output ports/ducts 315. This provides a convenient method for controlling the temperature while cooling the chip. Preferably, a barrier 350 prevents the heat from returning to the integrated circuits 225, 305. The combination of keyboard having keys 345, channel 340, and barrier 350 comprise a novel ventilated keyboard 355.

Figure 4:
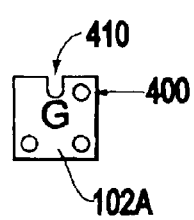
FIG. 4 illustrates a key 102A of the keyboard 102 having a hole 400 and a cutout 410 formed therein to facilitate air flow.

FIG. 4 illustrates a key 102A of the keyboard 102 having a hole 400 (and/or cutout 410) formed therein to facilitate air flow. That is, the keys 102A on the keyboard may include airflow holes 400 or cutouts 410 to facilitate air flow from beneath the keyboard to the air above the keys 102A. It is noted that while FIG. 4 illustrates the holes/cutouts in a semicircular arrangement on the edges of the key (which is probably the least intrusive to the user), the holes/cutouts could be placed on one or more of the sides of the keys.

Figure 5:
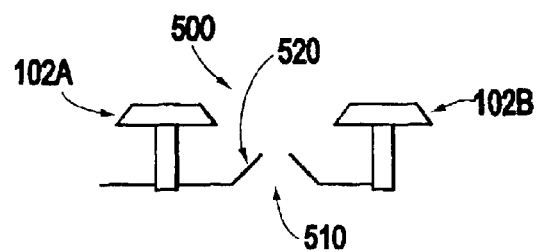
FIG. 5 illustrates that a gap 500 between adjacent keys 102A, 102B on the keyboard 102 has a closeable opening 520.

FIG. 5 illustrates that a gap 500 between adjacent keys 102A, 102B on the keyboard 102, with the gap 500 being a closeable opening. That is, the gaps 500 between the keys, which are also used to facilitate air flow 510 from beneath the keyboard 102 to a region above the keys, may contain closeable openings, so that, while air is not flowing, a plastic flap 520 may close to seal the gaps (holes) and thereby prevent dust and dirt from entering the region beneath the keys.

Figure 6A:
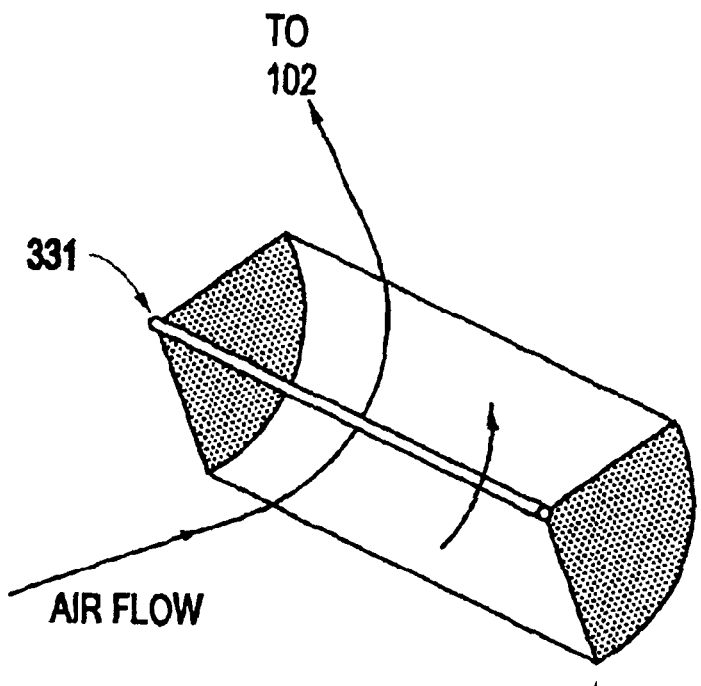
FIGS. 6A and 6B respectively illustrate an embodiment of a diverter 330A in which the diverter 330A is rotated to first and second positions (e.g., upwardly and downwardly)
Figure 6B:
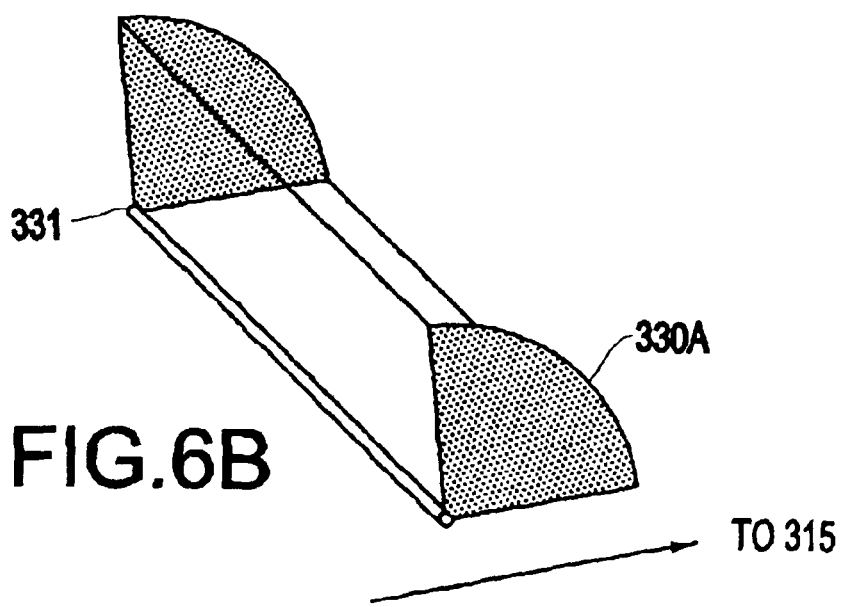

FIGS. 6A and 6B respectively illustrate a first embodiment of the diverter 330 in which a scoop 330A (e.g., similar to that shown in FIGS. 3A and 3B) is provided as the diverter 330 and is rotated to first and second positions (e.g., upwardly and downwardly).

That is, the rotating air diverter 330A may in the shape of a scoop so that, as shown in FIG. 6A, when the diverter 330A is in a first (e.g., downward) orientation air is diverted towards the keyboard. Conversely, as shown in FIG. 6B, when the diverter is in a second orientation (e.g., upward) the air flows out the traditional ports/ducts 315 to the outside ambient air (e.g., not to the keyboard 102). The diverter 330A may use an axial pivot 331 or the like.

Figure 7A:
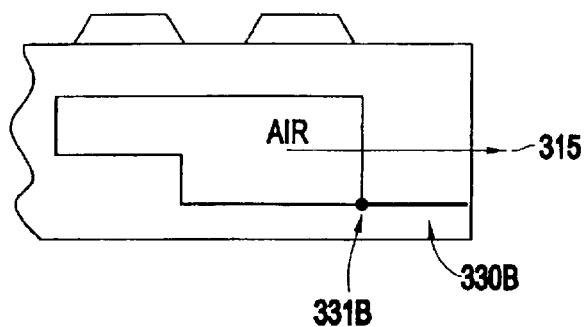
FIGS. 7A and 7B respectively illustrate a second embodiment of the diverter 330B in which the diverter is movable between first and second positions (e.g., upwardly and downwardly)
Figure 7B:
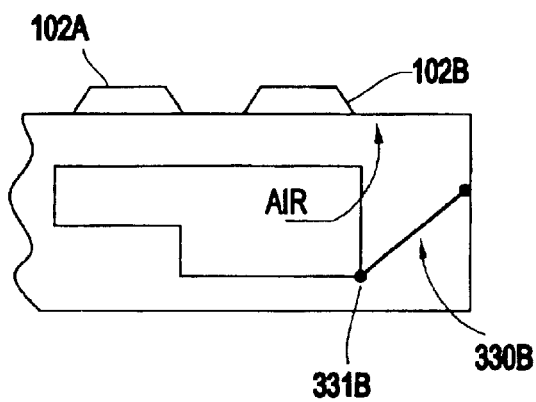

FIGS. 7A and 7B respectively illustrate a second embodiment of the diverter 330 which is provided as a diverter 330B movable between first and second positions (e.g., up and down). The diverter 330B can simply be a sheet of material (e.g., metal, plastic, or the like) which serves to block or redirect air flow. Diverter 330B can be hinged via a pivot 331B or the like to an interior component of the computer (e.g., a circuit board, a barrier 350, a fan case, a circuit mounting bracket or holder, etc.), or to the rib portion of the computer case (not shown in the figures).

When the diverter 330B is in the first position (e.g., down) as shown in FIG. 7A, the air flows outwardly through traditional ports/openings 315. When the diverter 330B is in the second position (e.g., upwardly facing) as shown in FIG. 7B, the air flows outwardly through the keys 102A, 102B of the keyboard.

Figure 8A:
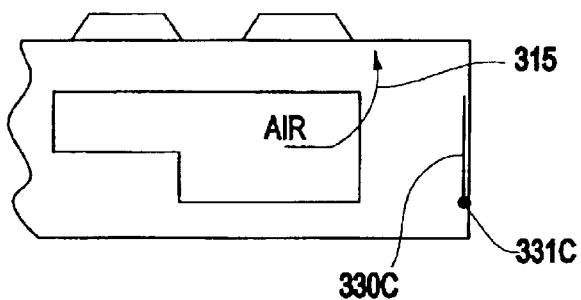
FIGS. 8A and 8B illustrates yet another embodiment of the diverter 330C.
Figure 8B:
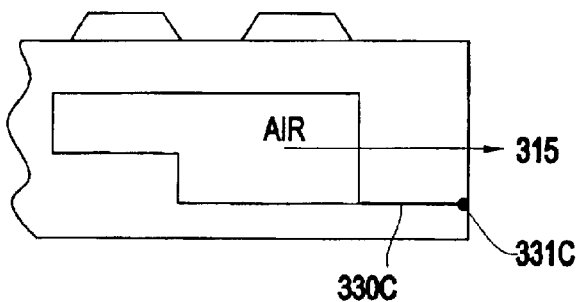

FIGS. 8A and 8B illustrates yet another embodiment of the diverter 330 provided as diverter 330C movable between first and second positions (e.g., up and down). The diverter 330C also can be a sheet of material (e.g., metal or the like) which serves to block or redirect air flow. However, diverter 330C is hinged via a pivot 331C or the like to an interior wall of the housing (unreferenced) of the computer 100.

When the diverter 330C is in the first position (e.g., up) as shown in FIG. 8A, the diverter closes of the port 315 to the outside. When the diverter 330C is in the second position (e.g., down) as shown in FIG. 8B, the diverter 330C allows the air to flow out the side of the computer housing.

Figure 9:
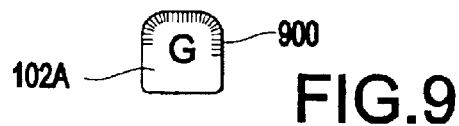
FIG. 9 illustrates a key 102A having a liquid crystal 900 formed thereon which change color according to an ambient temperature.

FIG. 9 illustrates a key 102A having a liquid crystal 900 formed thereon which changes color according to a temperature of the key. That is, the keys 102A, 102B, etc. on the keyboard 102 may contain thermochromic liquid crystals (TLCs) that change color in response to temperature. The palm rest 101 may also contain TLCs. Those skilled in the art will note that TLCs have been used in science and engineering in the assessment of experimental temperature data, for example, for the study of heat transfer, flow visualization and thermal mapping. Thus, the liquid crystals can be used on keys (and/or the palm rest) that change color for different temperatures. The liquid crystals may be on portions of the keys/palm rest, or the entire key/palm rest, or other regions on or near the user input area.

Figure 10:
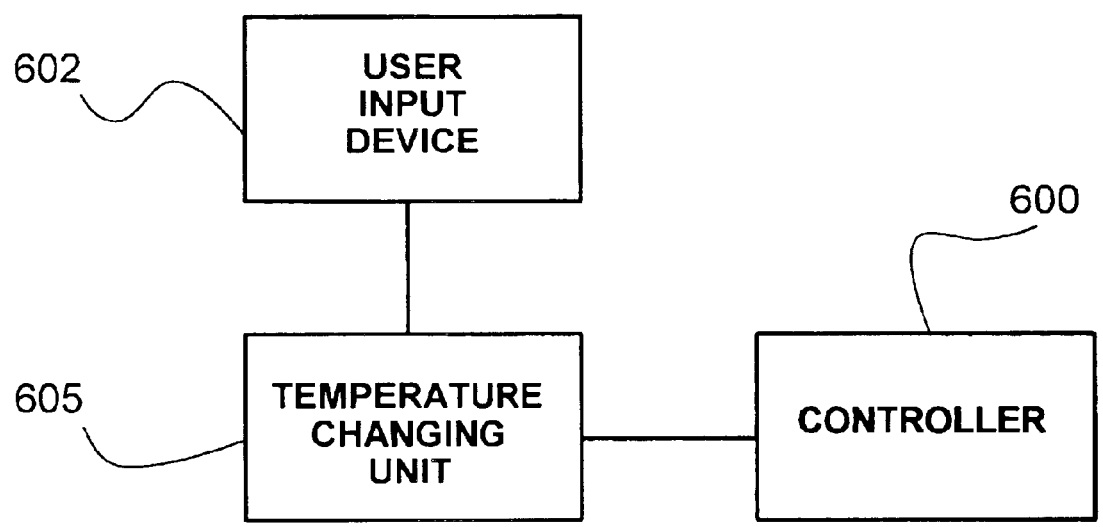
FIG. 10 illustrates an illustrative, non-limiting embodiment of a system according to the present invention.

FIG. 10 illustrates a system according to an exemplary embodiment of the invention, comprising a user input device 602, a temperature changing unit 605 coupled to the user input device 602, and a controller 600, coupled to the temperature changing unit 605, for controlling a temperature of the user input device 602.

While the invention has been described in terms of several preferred embodiments, those skilled in the art will recognize that the invention can be practiced with modification within the spirit and scope of the appended claims.

For example, as discussed above, the diverter can be controlled automatically (e.g., via software under computer control) based on temperature or the like, or manually by the user. Regarding the manual control, a dial or the like could be provided for the user to rotate manually to relatively control an amount of airflow.

What is claimed is:

1. A system, comprising:
    a user input device;
    a temperature changing unit coupled to the user input device; and
    a controller for controlling a temperature of the user input device,
        wherein said user input device includes at least one of a hole and a cutout formed therein to facilitate air flow,
        wherein said controller comprises a movable diverter that selectively controls the air flow from the temperature changing unit to at least one of the hole of the user input device, the cutout of the user input device, and an exterior of said system at a location other than a location of said user input device.

2. The system according to claim 1, wherein the user input device comprises at least one of a keyboard, a mouse, a phone handset, a joystick, a video-game controller, and a personal data assistant (PDA).

3. The system according to claim 1, wherein the temperature changing unit comprises at least one of a heater, a thin-film electric heater, a cooler, a thermoelectric cooler, a ventilated keyboard, and a ventilated palm rest.

4. A system, comprising:
    a user input device;
    a temperature changing unit coupled to the user input device;
    a controller for controlling a temperature of the user input device; and
    a palm rest adjacent said user input device,
        wherein the controller for controlling the temperature comprises a combination of an integrated circuit, a heat-pipe, a heat spreader for the palm rest, and a movable diverter, and
        wherein said movable diverter selectively controls the air flow from the integrated circuit to at least one of the user input device and an exterior of said system at a location other than a location of said user input device.

5. A system, comprising:
    a user input device;
    a temperature changing unit coupled to the user input device; and
    a controller for controlling a temperature of the user input device;
        wherein the controller for controlling the temperature comprises a combination of an integrated circuit, an air flow channel, a ventilated palm rest, and a movable diverter, and
        wherein said movable diverter selectively controls the air flow from the integrated circuit to at least one of the user input device and an exterior of said system at a location other than a location of said user input device.

6. A system, comprising:
    a user input device;
    a temperature changing unit coupled to the user input device;
    a controller for controlling a temperature of the user input device; and
    a palm rest adjacent said user input device,
        wherein the controller for controlling the temperature comprises a combination of a thin-film electric heater, a heat spreader for the palm rest, and a movable diverter, and
        wherein said movable diverter selectively controls the air flow from the thin-film electric heater to at least one of the user input device, the palm rest adjacent said user input device, and an exterior of said system at a location other than locations of said user input device and said palm rest.

7. A system, comprising:
    a user input device;
    a temperature changing unit coupled to the user input device; and
    a controller for controlling a temperature of the user input device;
        wherein the controller for controlling the temperature comprises a combination of an integrated circuit, an air flow channel, a keyboard, and a movable diverter that controls the air flow, and
        wherein said movable diverter selectively controls the air flow from the integrated circuit to at least one of the user input device and an exterior of said system at a location other than locations of said user input device and said keyboard.

8. A system, comprising:
    a user input device;
    a temperature changing unit coupled to the user input device; and
    a controller for controlling a temperature of the user input device,
        wherein a temperature change comprises a negative temperature change, and
        wherein said controller comprises a movable diverter that selectively controls the air flow from the temperature changing unit to at least one of the user input device and an exterior of said system at a location other than a location of said user input device.

9. The system according to claim 8, wherein the temperature changing unit comprises a thermoelectric cooler that changes the temperature.

10. The system according to claim 6, wherein the temperature changing unit includes a thermal sensor.

11. The system according to claim 7, wherein the diverter comprises a manually-controlled diverter that is adapted to be manually-controlled by a user.

12. The system according to claim 7, wherein the diverter is automatically-controlled by software.

13. The system according to claim 12, further comprising a user profile coupled to said controller, wherein control parameters are stored in said user profile.

14. A system, comprising:

a user input device;

a temperature changing unit coupled to the user input device;

a controller for controlling a temperature of the user input device; and wherein said user input device includes a plurality of function keys, and a closeable flap is formed to selectively cover a gap formed between adjacent ones of the function keys, such that when air is not flowing, said flap is closed to seal the gap.

15. A system, comprising:

a user input device;

a temperature changing unit coupled to the user input device; and a controller for controlling a temperature of the user input device;

wherein the controller for controlling the temperature comprises a combination of an integrated circuit, an air flow channel, and a keyboard, wherein the controller comprises a movable diverter that controls the air flow, and wherein said diverter comprises a scoop which is rotatable between first and second positions.

16. The system according to claim 15, wherein when the diverter is in said first position, air is diverted towards the user input device, and, when the diverter is in said second position the air flows out to the ambient air.

17. The system according to claim 7, wherein said diverter comprises a sheet mounted to an interior component of the system for redirecting air flow.

18. The system according to claim 7, further comprising:

a housing, wherein said diverter comprises a sheet mounted to an interior wall of said housing for redirecting said air flow.

19. A system, comprising:

a user input device;

a temperature changing unit coupled to the user input device; and a controller for controlling a temperature of the user input device;

wherein said user input device includes a liquid crystal formed thereon which changes color according to a temperature thereof, and wherein said controller comprises a movable diverter that selectively controls the air flow from the temperature changing unit to at least one of the user input device and an exterior of said system at a location other than a location of said user input device.

20. The system according to claim 19, wherein said user input device includes a plurality of function keys, at least one of said keys includes said liquid crystal formed thereon which changes color according to a temperature thereof.

21. The system according to claim 19, wherein said liquid crystal comprises a thermochromic liquid crystal (TLC).

22. The system according to claim 19, further comprising a palm rest adjacent said user input device, wherein said palm rest includes said liquid crystal formed thereon which changes color according to a temperature thereof.

23. The system according to claim 1, further comprising a palm rest adjacent said user input device, wherein said palm rest has holes formed therein to facilitate air flow, which is received from said diverter, through said palm rest.

24. The system according to claim 7, wherein said air flow channel is disposed beneath said keyboard, and wherein said system further comprises means for providing a flow of at least one of heated air and cooled air through said air flow channel.

25. The system according to claim 5, wherein said air flow channel is disposed beneath said palm rest, and wherein said system further comprises means for providing a flow of at least one of heated air and cooled air through said air flow channel.

26. The system according to claim 24, further comprising:

means for at least one of heating air and cooling air.

27. The system according to claim 25, further comprising:

means for at least one of heating air and cooling air.

28. The system according to claim 1, wherein the controller is coupled to the temperature changing unit.

29. The system according to claim 2, wherein the user input device comprises an integral palm rest.

30. The system according to claim 1, wherein said diverter comprises a scoop which is rotatable between first and second positions.

* * * * *